US012219656B2

(12) United States Patent
Sihotang et al.

(10) Patent No.: US 12,219,656 B2
(45) Date of Patent: Feb. 4, 2025

(54) SELECTIVELY RESTRICTING WI-FI CALLS SUPPORTED BY TELECOMMUNICATIONS NETWORK

(71) Applicant: T-Mobile USA, Inc., Bellevue, WA (US)

(72) Inventors: Jhon Nelson Sihotang, Bellevue, WA (US); Khurram Ahmad Mirza, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 272 days.

(21) Appl. No.: 17/891,511

(22) Filed: Aug. 19, 2022

(65) Prior Publication Data

US 2024/0064503 A1 Feb. 22, 2024

(51) Int. Cl.
*H04W 8/04* (2009.01)
*H04W 12/08* (2021.01)
*H04W 12/63* (2021.01)
*H04W 84/12* (2009.01)

(52) U.S. Cl.
CPC ............ *H04W 8/04* (2013.01); *H04W 12/08* (2013.01); *H04W 12/63* (2021.01); *H04W 84/12* (2013.01)

(58) Field of Classification Search
CPC ... G01S 5/0284; G01S 5/0036; H04L 5/0048; H04W 64/006
USPC ....................................................... 455/456.1
See application file for complete search history.

(56) References Cited

U.S. PATENT DOCUMENTS

| | | | |
|---|---|---|---|
| 6,542,497 B1 | 4/2003 | Curry et al. |
| 7,116,646 B1 | 10/2006 | Gustafson et al. |
| 7,133,670 B1 | 11/2006 | Moll et al. |
| 7,212,543 B1 | 5/2007 | Arwald et al. |
| 7,301,934 B1 | 11/2007 | Casati et al. |
| 7,313,227 B2 | 12/2007 | Jones |
| 7,330,453 B1 | 2/2008 | Borella et al. |
| 7,483,698 B2 | 1/2009 | Hurtta |

(Continued)

FOREIGN PATENT DOCUMENTS

| | | |
|---|---|---|
| CN | 101273615 B | 1/2013 |
| CN | 1902877 B | 2/2014 |

(Continued)

*Primary Examiner* — Ted M Wang
(74) *Attorney, Agent, or Firm* — Perkins Coie LLP (57) ABSTRACT

A system includes a session border controller (SBC) coupled to an internet protocol (IP) multimedia core subsystem (IMS) of a telecommunications network. The SBC obtains information indicative of a roaming profile of a particular subscriber associated with the telecommunications network. The roaming profile indicates geographic areas in which the particular subscriber is authorized to access a communications service. The SBC receives a request to connect a particular voice call over a Wi-Fi network from a wireless device on the telecommunications network. The wireless device is associated with the particular subscriber to the telecommunications network. The SBC identifies a current location of the wireless device and compares the current location of the wireless device with geographic areas in which the particular subscriber is authorized to access the communications service. The SBC can then enable or deny the IMS to establish a session for the particular voice call over the Wi-Fi network.

20 Claims, 4 Drawing Sheets

(56) References Cited

U.S. PATENT DOCUMENTS

| | | |
|---|---|---|
| 7,606,568 B2 | 10/2009 | Gallagher et al. |
| 7,609,682 B2 | 10/2009 | Ang et al. |
| 7,634,249 B2 | 12/2009 | Hahn et al. |
| 7,640,008 B2 | 12/2009 | Gallagher et al. |
| 7,738,426 B2 | 6/2010 | Smith et al. |
| 7,738,488 B2 | 6/2010 | Marsico et al. |
| 7,843,903 B2 | 11/2010 | Bakke et al. |
| 7,920,529 B1 | 4/2011 | Mahler et al. |
| 7,936,683 B2 | 5/2011 | Qiu et al. |
| 7,962,120 B2 | 6/2011 | Cai et al. |
| 7,970,398 B2 | 6/2011 | Palamara et al. |
| 7,974,624 B2 | 7/2011 | Gallagher et al. |
| 7,975,037 B2 | 7/2011 | Tai et al. |
| 7,995,994 B2 | 8/2011 | Khetawat et al. |
| 7,996,007 B2 | 8/2011 | Bantukul |
| 8,060,135 B2 | 11/2011 | Bales et al. |
| 8,078,166 B2 | 12/2011 | Thiebaut et al. |
| 8,165,063 B2 | 4/2012 | Kim et al. |
| 8,189,549 B2 | 5/2012 | Caldwell et al. |
| 8,223,631 B2 | 7/2012 | Yasrebi et al. |
| 8,250,634 B2 | 8/2012 | Agarwal et al. |
| 8,254,553 B2 | 8/2012 | Agarwal et al. |
| 8,279,798 B2 | 10/2012 | Preiss et al. |
| 8,305,932 B2 | 11/2012 | Qiu et al. |
| 8,305,983 B2 | 11/2012 | Siegel et al. |
| 8,385,332 B2 | 2/2013 | Aggarwal |
| 8,411,691 B2 | 4/2013 | Aggarwal |
| 8,432,923 B2 | 4/2013 | Ku |
| 8,495,226 B2 | 7/2013 | Lau |
| 8,601,141 B2 | 12/2013 | Veenstra et al. |
| 8,626,113 B2 | 1/2014 | Banjo |
| 8,638,717 B2 | 1/2014 | Chen et al. |
| 8,644,223 B2 | 2/2014 | Schmidt et al. |
| 8,966,034 B1 | 2/2015 | Paczkowski et al. |
| 9,110,685 B2 | 8/2015 | Suryanarayana et al. |
| 9,191,804 B1 | 11/2015 | Paczkowski et al. |
| 9,232,386 B2 | 1/2016 | Mannepally |
| 9,264,944 B1 | 2/2016 | Brewer |
| 9,578,069 B1 | 2/2017 | Beech et al. |
| 9,609,510 B2 | 3/2017 | Raleigh et al. |
| 9,661,602 B2 | 5/2017 | Annamalai et al. |
| 9,716,999 B2 | 7/2017 | Zhang et al. |
| 9,807,059 B2 | 10/2017 | Ståhl |
| 9,876,670 B2 | 1/2018 | Richardson |
| 9,924,344 B1 | 3/2018 | Datar |
| 9,986,414 B1 | 5/2018 | Mangal et al. |
| 10,491,641 B2 | 11/2019 | Mufti et al. |
| 11,165,833 B2 | 11/2021 | Corona et al. |
| 2005/0177515 A1 | 8/2005 | Kalavade et al. |
| 2006/0052113 A1 | 3/2006 | Ophir et al. |
| 2006/0136557 A1 | 6/2006 | Schaedler et al. |
| 2007/0021118 A1 | 1/2007 | Ophir |
| 2007/0038723 A1 | 2/2007 | Gourraud |
| 2007/0047523 A1 | 3/2007 | Jiang |
| 2007/0153813 A1 | 7/2007 | Terpstra et al. |
| 2008/0176589 A1 | 7/2008 | Bantukul |
| 2008/0219241 A1 | 9/2008 | Leinonen et al. |
| 2008/0274735 A1 | 11/2008 | Choksi et al. |
| 2009/0041223 A1 | 2/2009 | Agarwal et al. |
| 2009/0213837 A1 | 8/2009 | Ku et al. |
| 2009/0232128 A1 | 9/2009 | Paulis et al. |
| 2009/0303875 A1 | 12/2009 | Matsumura |
| 2010/0029272 A1 | 2/2010 | Mccann et al. |
| 2010/0223326 A1 | 9/2010 | Noldus et al. |
| 2011/0125925 A1 | 5/2011 | Bouthemy et al. |
| 2011/0151865 A1* | 6/2011 | Lau .................. H04W 8/20 455/433 |
| 2011/0158183 A1 | 6/2011 | Siegel et al. |
| 2012/0134323 A1 | 5/2012 | Perkuhn et al. |
| 2012/0185578 A1 | 7/2012 | Perkuhn et al. |
| 2013/0054428 A1 | 2/2013 | Shaikh |
| 2013/0155875 A1 | 6/2013 | Ayyasamy et al. |
| 2014/0018039 A1 | 1/2014 | Lau |
| 2014/0073289 A1* | 3/2014 | Velasco .................. H04W 12/04 455/411 |
| 2016/0021539 A1 | 1/2016 | Piscopo et al. |
| 2016/0255490 A1 | 9/2016 | Mufti et al. |
| 2018/0352408 A1 | 12/2018 | Baer et al. |
| 2020/0037281 A1 | 1/2020 | Lee et al. |
| 2021/0360040 A1 | 11/2021 | Abdelmalek et al. |

FOREIGN PATENT DOCUMENTS

| | | |
|---|---|---|
| CN | 104335545 B | 1/2018 |
| EP | 2079215 A1 | 7/2009 |
| JP | 2008507217 A | 3/2008 |
| JP | 2021501504 A | 1/2021 |
| KR | 101246014 B1 | 3/2013 |
| KR | 101454764 B1 | 11/2014 |
| KR | 101520811 B1 | 5/2015 |
| KR | 101730726 B1 | 4/2017 |
| WO | 0131939 A2 | 5/2001 |
| WO | 2006105223 A1 | 10/2006 |
| WO | 2006130783 A2 | 12/2006 |
| WO | 2010102242 A2 | 9/2010 |
| WO | 2014159166 A1 | 10/2014 |
| WO | 2017172813 A1 | 10/2017 |

* cited by examiner

SELECTIVELY RESTRICTING WI-FI CALLS SUPPORTED BY TELECOMMUNICATIONS NETWORK

BACKGROUND

Wi-Fi calling (also referred to as voice over Wi-Fi or VoWiFi) is a calling feature that allows users of wireless devices (e.g., mobile phones) to call and receive calls while in communication with a Wi-Fi network. The Wi-Fi calls are enabled by the telecommunications service provider. The distinction between a Wi-Fi call and a cellular voice call is in the last mile connectivity. In a Wi-Fi call, a mobile phone uses the Wi-Fi network to establish voice calls between the mobile phone and the cellular network instead of the cellular network. The Wi-Fi calls can be made using the same dialer and contact list of a mobile phone as cellular voice calls. A Wi-Fi call can be, for example, automatically connected when cellular service is limited or unavailable. Similarly, voice calls can be automatically connected to a cellular network when Wi-Fi coverage is not available. In theory, Wi-Fi calls can be established at Wi-Fi access points anywhere around the world. With current technologies, access from a particular geographic region (e.g., a country) can be indiscriminately blocked or allowed by the telecommunications service provider for all users or all calls.

BRIEF DESCRIPTION OF THE DRAWINGS

Detailed descriptions of implementations of the present technology will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to selectively restricting Wi-Fi calls from mobile devices based on geographical locations of the mobile devices or with other features associated with the Wi-Fi calls. For example, the disclosed technology can block Wi-Fi calls that are suspected to cause security risks (e.g., fraud or scam calls) or that are made from geographical locations that are not included with a subscriber's billing plan. That is, a Wi-Fi call can be restricted based on a geographical location of a mobile device attempting to make the call. In one example, the disclosed technology includes a session border controller (SBC) that is coupled to an internet protocol (IP) multimedia core subsystem (IMS) of a wireless network. The SBC can determine whether a subscriber associated with a mobile device is authorized to establish a Wi-Fi call by comparing the subscriber profile indicating geographical areas that the subscriber is authorized to make calls with the current location of the mobile device. When the SBC determines that the subscriber is authorized to make Wi-Fi calls from the current geographical location of the mobile device, the SBC can enable the IMS to connect the call. When the subscriber is not authorized to make Wi-Fi calls from the current geographical location, the SBC can block the call. The SBC can also evaluate features associated with the calls (e.g., security information associated with a Wi-Fi call) for determining whether to block or enable establishing a particular Wi-Fi call.

In particular, the SBC can obtain information indicative of a roaming profile of a particular subscriber associated with the telecommunications network. The information of the roaming profile can be retrieved from a home subscriber server (HSS) of the telecommunications network. The roaming profile can indicate one or more geographic areas in which the particular subscriber is authorized to access a communications service. The SBC can receive a request to connect a particular voice call over a Wi-Fi network associated with the telecommunications network from a wireless device on the telecommunications network. The wireless device is associated with the particular subscriber. The SBC can identify a current location of the wireless device based on network registration information for the wireless device on the telecommunications network. The SBC can compare the current location of the wireless device with the one or more geographic areas in which the particular subscriber is authorized to access the communications service as indicated in the roaming profile. The SBC can determine that a particular geographic area of the one or more geographic areas includes the current location and, in response, authorizes the particular subscriber to access the communications service. The SBC can then enable the IMS to establish a session for the particular voice call over the Wi-Fi network. The SBC can alternatively determine that the particular geographic area of the one or more geographic areas does not include the current location. In response to such determination, the SBC can does not authorize the particular subscriber to access the communications service and forgoes enabling the IMS to establish the session for the particular voice call over the Wi-Fi network.

In another example, a computer-implemented method includes connecting voice calls based on requests from wireless devices received via a Wi-Fi network to an IMS of a telecommunications network. The method can include receiving, by an SBC, from a wireless device on the telecommunications network, a request to connect a particular voice call over a Wi-Fi network communicatively coupled to the telecommunications network. The wireless device can be associated with a particular subscriber of the telecommunications network. The method can include identifying a current location of the wireless device based on network registration information of the wireless device on the telecommunications network. The method can include comparing the current location of the wireless device with one or more geographic areas in which the particular subscriber is authorized to access a communications service as indicated in a particular subscriber profile of the particular subscriber.

The method can include determining that a particular geographic area of the one or more geographic areas includes the current location and authorizing the particular subscriber to access the communications service. The method then includes enabling the IMS to establish a session for the particular voice call over the Wi-Fi network. The method can also include determining that the particular geographic area of the one or more geographic areas does not include the current location. In response to such determination, the SCB does not authorize the particular subscriber to access the communications service and forgoes enabling the IMS to establish the session for the particular voice call over the Wi-Fi network.

In yet another example, a wireless device is in communication with a telecommunications network. The wireless device can send a request to connect a particular voice call over a Wi-Fi network. The request is sent to an SBC of a system associated with the telecommunications network. The wireless device can be associated with a particular subscriber of the telecommunications network. The request to connect the voice call can be associated with one or more features. The wireless device can receive a signal indicating that the subscriber is either authorized or unauthorized to connect the voice call over the Wi-Fi network. The SBC determines whether the subscriber is authorized or unauthorized to access a communications service based on the comparison of the one or more features with a subscriber profile associated with the subscriber. When the subscriber is authorized to access the communications service, the wireless device can connect the wireless device to a session for the voice call over the Wi-Fi network. When the subscriber is unauthorized to access the communications service, the wireless device can forgo connecting the voice call over the Wi-Fi network.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
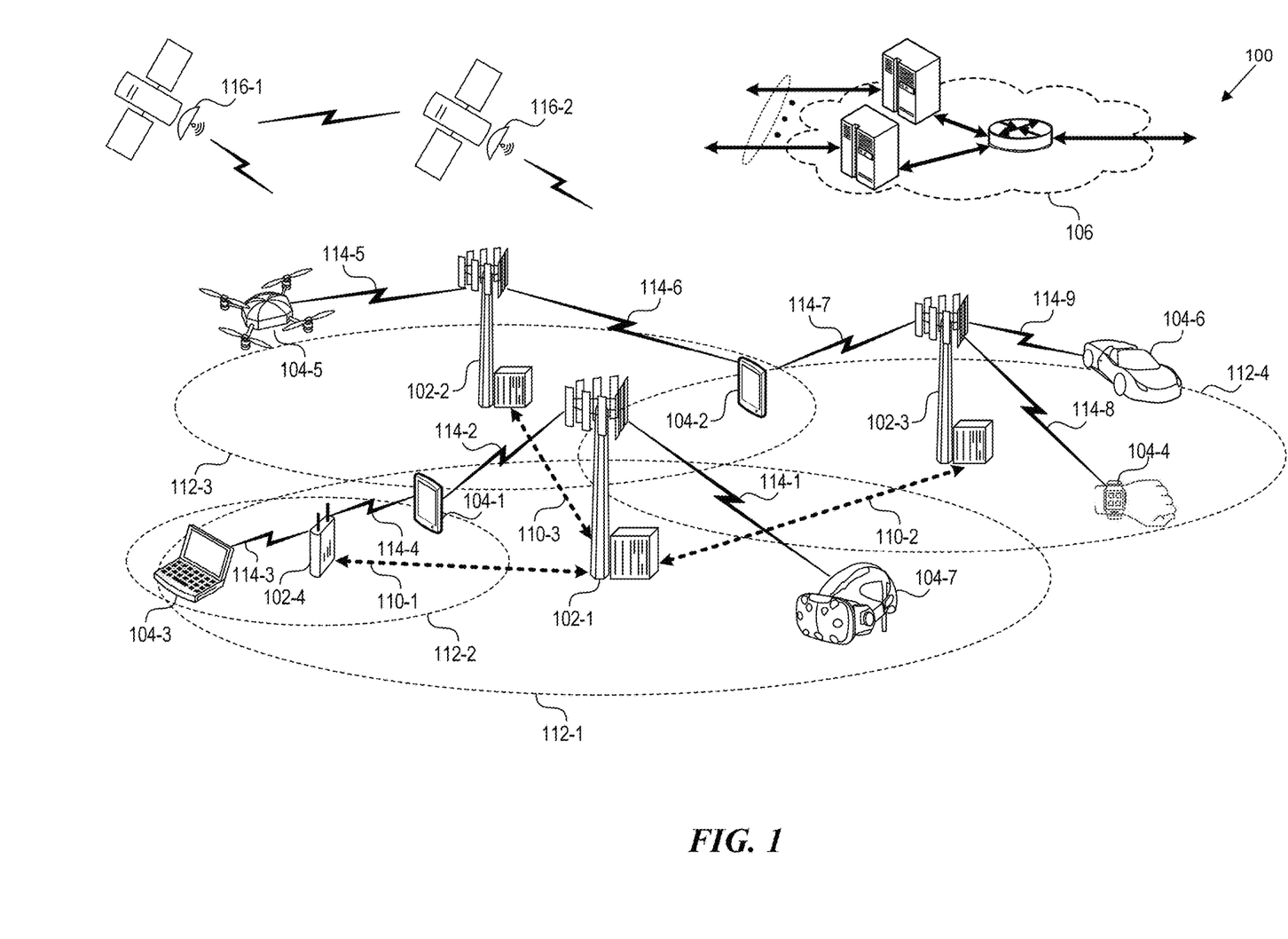
FIG. 1 is a block diagram that illustrates a wireless communications system that can implement aspects of the present technology.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

The network 100 can implement 6G, which is the sixth-generation standard and successor to 5G. Examples of 6G technologies include broadband cellular networks, increased densification, and/or increased diversification. In another example of 6G, the network 100 enables terrestrial and non-terrestrial transmissions, where a non-terrestrial network (NTN) is enabled by satellites 116-1 and 116-2 to deliver communications services anywhere, and can also provide coverage in areas that are unreachable by a conventional terrestrial network (TN). In yet another example of 6G, the network 100 can implement terahertz (THz) communications. This will support wireless applications that demand ultrahigh quality of service requirements and multi-terabits per second data transmission, such as terabit-per-second backhaul systems, ultrahigh-definition content streaming among mobile devices, ARNR technology (e.g., creating a virtual presence in the metaverse), and wireless high-bandwidth secure communications.

Wi-Fi Calling Systems

Figure 2:
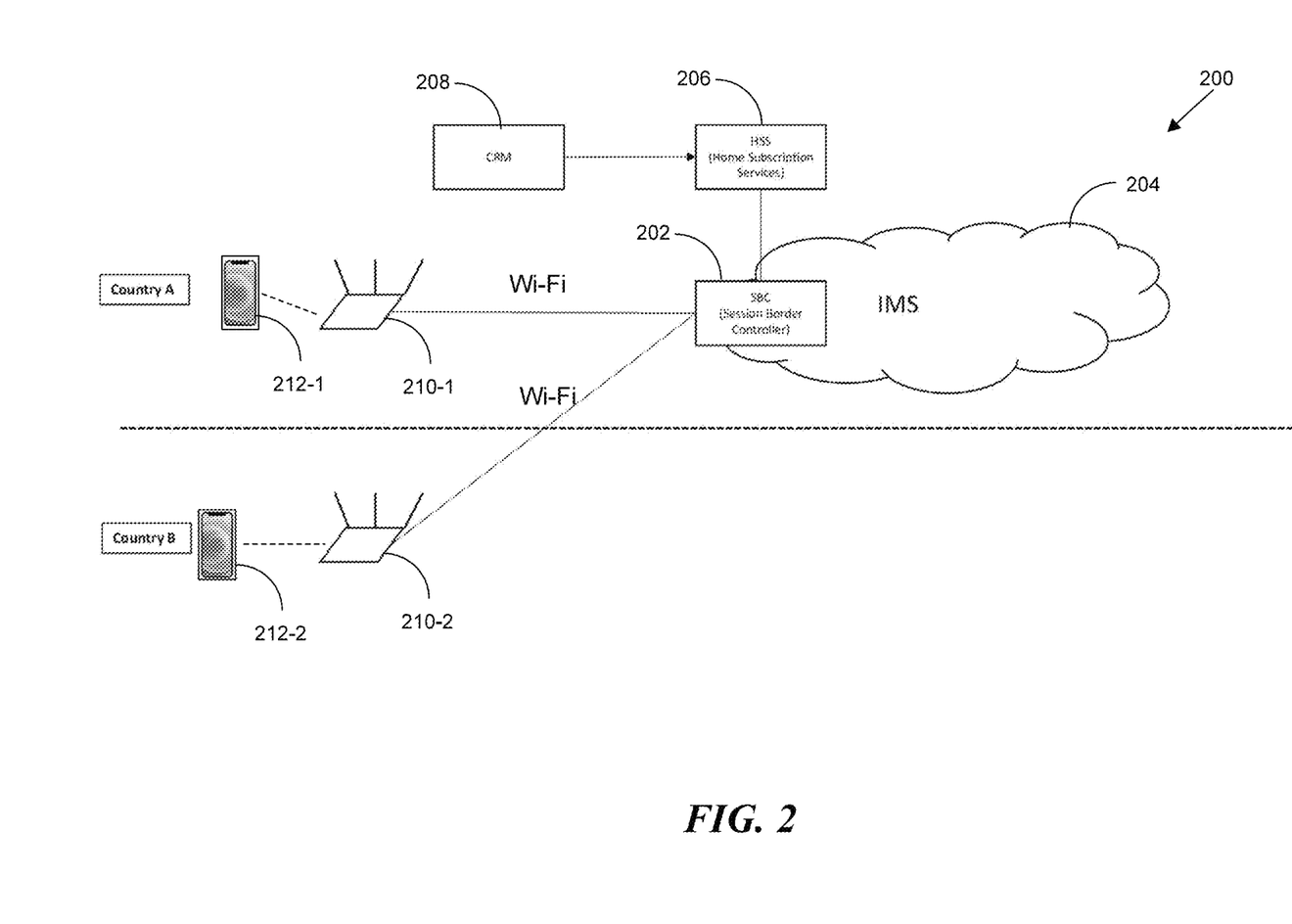
FIG. 2 is a block diagram that illustrates a system for selectively restricting Wi-Fi calls supported by a telecommunications network.

FIG. 2 is a block diagram that illustrates a system 200 for selectively restricting Wi-Fi calls. The system 200 is associated with a telecommunications network service provider (e.g., a provider for Wi-Fi network or cellular network services). The system 200 includes a session border controller (SBC) 202 that is communicatively coupled with an internet protocol (IP) multimedia core subsystem (IMS) (e.g., IMS 204) and a home subscription service (HSS) system (e.g., HSS 206). The system 200 further includes a customer relationship management (CRM) system (e.g., CRM 208) that is in communication with the HSS 206. The SBC 202 of the system 200 is further in communication with multiple wireless devices (e.g., the wireless devices 212-1 and 212-2 are collectively referred to as "wireless devices 212") via a Wi-Fi network.

The IMS 204 includes a standardized architectural framework for delivering IP multimedia services. The IP multimedia services can include voice, video, and text messaging over IP networks. The IMS 204 can include multiple layers for providing functions to manage signals and network traffic for multimedia services. The multiple layers can include, for example, a service and application layer, a control layer, and a transport layer. Conventionally, the IMS control layer (also referred to as the IMS core) can control communications within the IP networks selectively based on subscriber profiles and/or network policies or standards. However, the IMS 204 does not have the ability to control voice calls originating from W-Fi networks based on the subscriber profiles and/or network policies and standards.

The SBC 202 is configured to control communications between the IMS 204 and other networks (e.g., Wi-Fi networks or networks of different service providers). The SBC 202 can receive voice call requests from wireless devices 212 and either send the requests to the IMS 204 or block the voice calls by forgoing sending the requests to the IMS 204. In particular, in accordance with the present disclosure, the SBC 202 can determine whether a voice call request from a respective wireless device 212 received via a Wi-Fi network (e.g., a VoWiFi) should be established and sends or forgoes sending the request to the IMS 204 accordingly. The SBC 202 can determine whether a voice call request should be sent to the IMS 204 based on user subscriber information (e.g., information included in subscriber profiles) associated with the wireless devices sending the voice call requests or based on network policies (e.g., quality or security policies) or standards. For example, the user subscription information includes types of network services available to different subscribers based on their billing plans. As another example, the network policies and standards can include an audio quality, a bandwidth, and/or a compression information associated with the voice calls. The network policies and standards can also include security and reliability standards (e.g., for determining whether a call is a fraud or scam call).

The HSS 206 includes a subscriber database associated with the system 200 which stores and provides details of the subscribers of the telecommunications network to other entities within the system 200. The HSS 206 stores and provides, for example, subscriber profiles associated with users subscribed to the telecommunications network. The subscriber profiles can include information about subscribers' wireless plans. A wireless plan refers to a service and billing agreement between a subscriber and telecommunications network that allows the subscriber to, for example, make and receive voice calls and messages and access the Internet via cellular data. The subscriber profiles are associated with particular wireless devices. For example, a mobile phone is associated with a particular phone number that a user of the mobile phone can use for calling and receiving voice calls.

The phone number is further associated with the user's subscriber profile. In some implementations, subscriber profiles include information regarding roaming access (e.g., a subscriber profile can include or correspond to a roaming profile). Roaming refers to the usage by wireless devices on another operator's network. Roaming can apply, for example, between networks of different geographical areas (e.g., different countries). A roaming profile can include information about geographical areas where a subscriber is authorized to access the telecommunications network via a Wi-Fi network based on the subscriber's wireless plan. The HSS 206 is further in communication with the CRM 208. The CRM 208 is configured to manage the relationships between the subscribers and the telecommunications network. For example, the CRM 208 stores information regarding the wireless plans of the subscribers and provides such information in the form of subscriber/network profiles to the HSS 206.

As shown in FIG. 2, the system 200 is in communication with multiple wireless devices 212 via one or more Wi-Fi networks. The wireless devices 212 can include any wireless devices with the capability of making voice calls (e.g., smartphones or mobile phones). The wireless devices 212 are associated with subscribers of the telecommunications service provider of system 200. For example, users of the wireless devices 212 have subscribed to a network plan administered by the telecommunications service provider and are thereby authorized to access network services provided by the system 200. In particular, the wireless devices 212 can communicate with the SBC 202 via the Wi-Fi network. For example, the wireless device 212-1 can communicate with the SBC 202 via a Wi-Fi access node 210-1 (e.g., a router), and the wireless device 212-2 can communicate with the SBC 202 via a Wi-Fi access node 210-2.

The Wi-Fi network(s) can be or include a public Wi-Fi network or a network associated with the same telecommunications network as system 200. The wireless devices 212 can send requests to the SBC 202 to establish Wi-Fi calls by the IMS 204. As described earlier, a Wi-Fi call refers to a voice call that can be made using the same dialer and contact list of a mobile phone as other cellular voice calls (e.g., no special mobile application is needed for making Wi-Fi calls). The wireless devices 212 are also configured to send registration information to the SBC 202 as they connect to a telecommunications network. The registration information can include information on the current locations of the wireless devices. The registration information can be sent to the SBC 202, for example, when a respective wireless device is turned on or the respective wireless device connects to a new network and periodically thereafter.

In accordance with the present technology, the SBC 202 can receive and store subscriber profiles (or roaming profiles) received from the HSS 206. After receiving a request to connect a voice call from a respective wireless device 212, the SBC 202 can compare information associated with voice call requests received from the wireless devices 212 with the subscriber profiles. The information associated with the voice call requests can include the current geographical location of the respective wireless device 212 making the voice call request. In such instances, the SBC 202 can compare the current geographical location of the respective wireless device with the corresponding subscriber profile to determine whether the respective wireless device is authorized to make the voice call.

In one example, the wireless devices 212-1 and 212-2 are associated with the same roaming profiles (e.g., users of the wireless devices 212-1 and 212-2 have subscribed for the same type of wireless plan). The roaming profile does not allow the subscribers to make Wi-Fi calls from countries other than Country A. The SBC 202 can, therefore, block a voice call request received from the wireless device 212-2 that is currently located in Country B while sending a voice call received from the wireless device 212-1 that is currently located in Country A, As another example, the wireless device 212-2 located in Country B is not a subscriber of the telecommunications network and is attempting to make a scam or fraud call. A scam or fraud call can, for example, be an automated robocall aimed at stealing information or money from its recipient. Such calls may appear to be coming from domestic phone numbers though are originally initiated from a different country. The SBC 202 can determine that a voice call request from the wireless device 212-2 is not associated with any of the subscriber profiles stored at the SBC 202 and block the voice call request from the wireless device 212-2 accordingly.

In some implementations, the information associated with the voice call requests received from the wireless devices 212 can include audio quality, bandwidth, and compression of voice calls. The information associated with the voice call can also include information that allows the SBC 202 to determine whether a requested voice call would correspond to a scam or fraud call.

Figure 3:
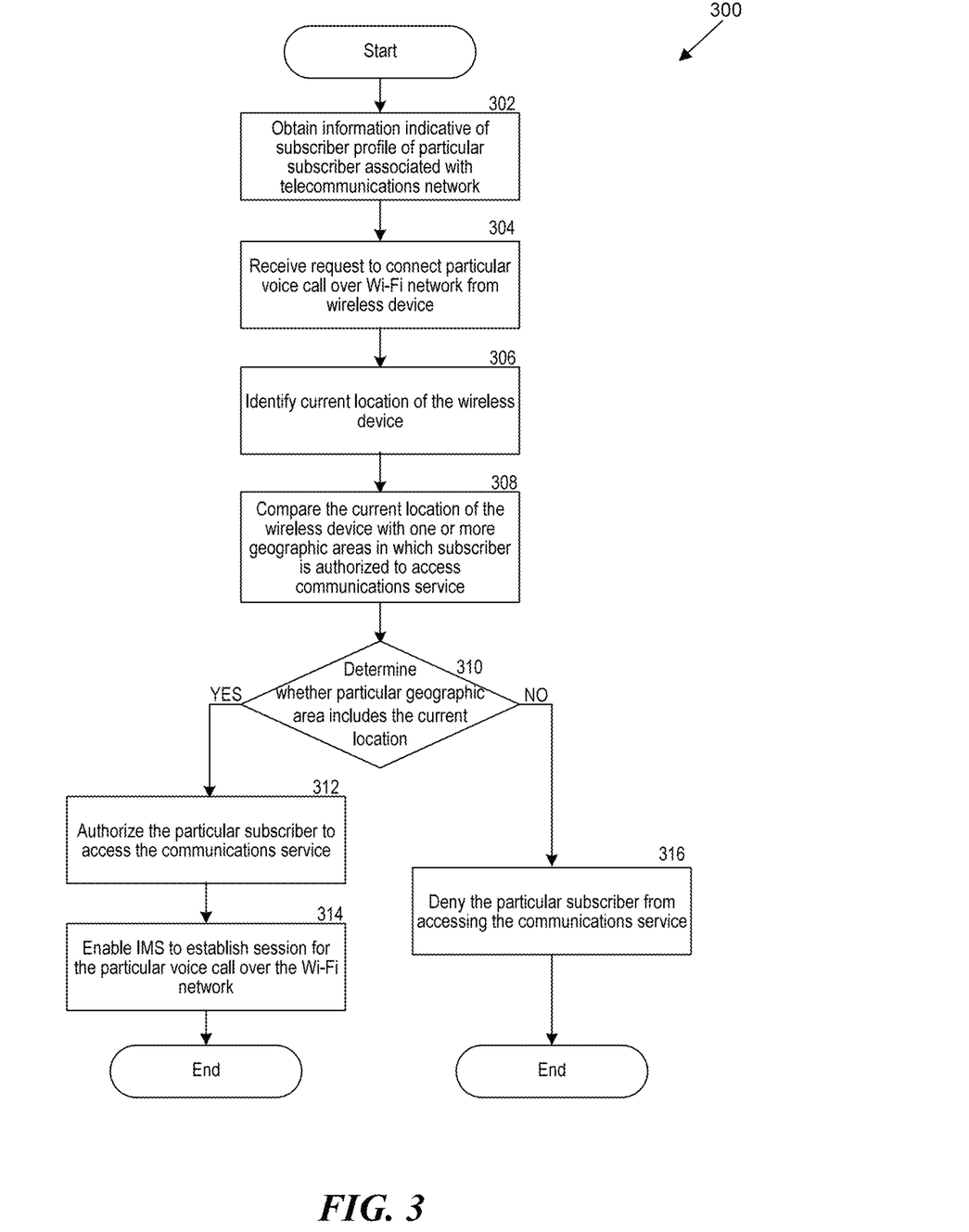
FIG. 3 is a flowchart that illustrates processes for selectively restricting Wi-Fi calls supported by a telecommunications network.

FIG. 3 is a flowchart that illustrates processes 300 for selectively restricting Wi-Fi calls. The processes 300 can be performed by a system including an SBC coupled to an IMS of a telecommunications network (e.g., the system 200 including the SBC 202 and the IMS 204 described with respect to FIG. 2). The SBC can include at least one hardware processor and at least one non-transitory memory storing instructions. For example, the SBC includes a computing system 400 described with respect to FIG. 4. When the instructions are executed by the at least one hardware processor, the SBC performs the processes 300.

At 302, the SBC obtains information indicative of a subscriber profile (e.g., a roaming profile) of a particular subscriber associated with the telecommunications network. The information of the subscriber profile is retrieved from a home subscriber server (HSS) of the telecommunications network. The subscriber profile can indicate one or more geographic areas in which the particular subscriber is authorized to access a communications service. The geographic areas can include different countries. For example, the wireless devices 212 in FIG. 2 can be authorized to access the communications service when located in Country A but not when located in Country B.

In some implementations, the system can store multiple subscriber profiles for multiple subscribers at the SBC. The multiple subscribers can include the particular subscriber. For example, the SBC 202 receives subscriber profiles of all or almost all subscribers associated with the telecommunication system from the HSS 206 and stores them to a database.

At 304, the SBC receives a request from a wireless device subscribed to the telecommunications network to connect a particular voice call over a Wi-Fi network. The wireless device can be associated with the particular subscriber. For example, the wireless device 212-1 in FIG. 2 sends the SBC 202 a request to connect a voice call while in communication with a Wi-Fi network via the Wi-Fi access node 210-1. The Wi-Fi network can associated with the telecommunications network or a public Wi-Fi network.

At 306, the SBC identifies a current location of the wireless device based on network registration information for the wireless device on the telecommunications network. As an example, the network registration information of the wireless device 212-1 is communicated to the SBC 202 when the wireless device 212-1 connects to the telecommunications network associated with the system 200. The network registration information indicates that the wireless device 212-1 is located in Country A (e.g., the same geographical area where the system 200 is located). Similarly, the registration information of the wireless devices 212-2 includes an indication that the wireless device 212-2 is located in Country B (e.g., different geographical area than where the system 200 is located).

For example, prior to the request to connect the particular voice call, the wireless device performs registration of the wireless device with the telecommunications network. The current location of the wireless device is provided to the telecommunications network during the registration. The subscriber profile (or a roaming profile) associated with the particular subscriber indicates locations in which the wireless device is authorized to access the communications service.

In some implementations, the SBC stores instances of the network registration information of multiple wireless devices registered on the telecommunications network. The instances of registration information can indicate respective geographic locations when the multiple wireless devices are registered to the telecommunications network. A particular instance of registration information can be captured upon a particular wireless device connecting to the telecommunications network. A particular instance of the registration information can also be captured periodically thereafter. For example, the wireless device 212-2 of FIG. 2 can be registered after being connected to a new telecommunications network in Country B (e.g., after changing location from Country A to Country B). In that example, the network registration information including an indication of the current geographic location of the wireless device 212-2 is sent to the SBC 202. The wireless device 212-2 can also be registered upon being turned on (e.g., after a period of being turned off). After initial registration, the registration information can be periodically captured and updated to the SBC 202.

The current location of the wireless devices can be determined based on, for example, the location of the Wi-Fi access nodes that the wireless devices are in communication with. For example, the location of the wireless devices 212-1 and 212-2 can be determined based on their communication with the Wi-Fi access nodes 210-1 and 210-2, respectively. Alternatively or additionally, the current locations of the wireless devices can be determined based on GPS trackers of the wireless devices, or locations of cell sites that the wireless devices are in communication with. This location information can be provided in a form of LANI (Last Address Network Identity), PAM (Preferred Address Network Identity), or any information related to network identity in SIP register.

At 308, the SBC compares the current location of the wireless device with the one or more geographic areas in which the particular subscriber is authorized to access the communications service as indicated in the subscriber profile. For example, in response to receiving the request, the SBC can lookup, based on an identifier of the particular subscriber, the subscriber profile of the particular subscriber from among multiple subscriber profiles stored at the SBC. The request can include the identifier of the particular subscriber. Alternatively, the SBC can look up the subscriber profile of the particular subscriber from among the multiple subscriber profiles stored at the HSS.

At 310, the SBC determines whether a particular geographic area of the one or more geographic areas includes the current location. For example, the SBC 202 in FIG. 2 can determine that Country A, where the wireless device 212-1 is located, is included in the one or more geographic areas that the subscriber associated with the wireless device 212-1 is authorized to make Wi-Fi calls from.

At 312, in response to a determination that the particular geographic area of the one or more geographic areas includes the current location, the SBC authorizes the particular subscriber to access the communications service in accordance with the determination at 310. The particular geographical area can correspond to a country (e.g., Country A or Country B).

At 314, in instances where the particular subscriber is authorized to access the communications service, the SBC enables the IMS to establish a session for the particular voice call over the Wi-Fi network. For example, when the SBC has determined that the particular subscriber is authorized to access the communications service in accordance with the determination at 310, the SBC sends the request for the particular voice call to the IMS thereby enabling the IMS to establish a session for the particular voice call.

At 316, in response to a determination that the particular geographic area of the one or more geographic areas does not include the current location, the SBC denies the particular subscriber from accessing the communications service (e.g., the SBC does not authorize the particular subscriber to access the communications service and thereby forgoes enabling the IMS to establish the session for the particular voice call).

In some implementations, the SBC sends an indicating signal to the wireless device indicating that the subscriber is either authorized or unauthorized to connect the particular voice call over the Wi-Fi network.

For example, the SBC receives, from the wireless device on the telecommunications network, a second request to connect a particular voice call over the Wi-Fi network associated with the telecommunications network. The wireless device is located in a second location and the second location is outside the one or more geographic areas in which the particular subscriber is authorized to access a communications service (e.g., the wireless device 212-1 has changed its location from Country A to Country B). The SBC thereby forgoes enabling the IMS to establish the second particular voice call over the Wi-Fi network.

Alternatively, the second request is from a wireless device that is not associated with any subscriber profile or is associated with a subscriber profile that is associated with scam or fraud phone calls. The SBC can thereby forgo enabling the IMS to establish the second particular voice call over the Wi-Fi network.

In some implementations, prior to the particular voice call being connected via the Wi-Fi network, the subscriber profile is stored at the SBC. The determination that the particular subscriber is (or is not) authorized to access the communications service is based on the subscriber profile stored at the SBC. In some implementations, the determination that the particular subscriber is (or is not) authorized to access the communications services is based on the subscriber profile stored at the HSS. In some implementations, the SBC can receive periodic updates of the subscriber profile from the HSS. The periodic updates of the subscriber profile can be stored at the SBC.

For example, in an instance that a billing plan associated with a subscription of the particular subscriber to the telecommunications network has changed at a CRM system (e.g., CRM 208 in FIG. 2) of the telecommunications network, the SBC can receive updated information on the subscriber profile from the HSS based on the change at the CRM system. The updated information of the subscriber profile can be stored at the SBC. For example, the particular subscriber associated with the wireless device has upgraded their wireless plan to include roaming from a foreign country. The SBC can receive the information regarding the upgrade in an updated subscriber profile and thereby allow the wireless device to connect voice calls when located in the foreign country.

In some implementations, the request to connect the voice call is associated with one or more features (e.g., features other than the geographical location of the wireless device). The SBC can compare the one or more features with a particular subscriber profile associated with the particular subscriber. The SBC can determine whether the subscriber is authorized or unauthorized to access a communications service based on the comparison of the one or more features with a subscriber profile associated with the subscriber. When the subscriber is authorized to access the communications service, the SBC can connect the wireless device to a session for the voice call over the Wi-Fi network. When the subscriber is unauthorized to access the communications service, the SBC can forgo connecting the voice call over the Wi-Fi network.

In some implementations, the voice call over the Wi-Fi network is denied when the SBC determines that the voice call is a fraud call. For example, the SBC can determine, based on the comparison, whether the requested voice call is a fraud call. Based on the determination that the requested voice call is a fraud call, the SBC can forgo enabling the establishment of the session for the particular voice call over the Wi-Fi network.

In some implementations, the one or more features associated with the request to connect the voice call include audio quality, bandwidth, and/or compression of the voice call. As such, determining, based on the comparison, that the particular subscriber is authorized to access the communications service includes determining that the subscriber is authorized to access the communications service based on whether the session supports the audio quality, the bandwidth, and/or the compression.

Computer System

Figure 4:
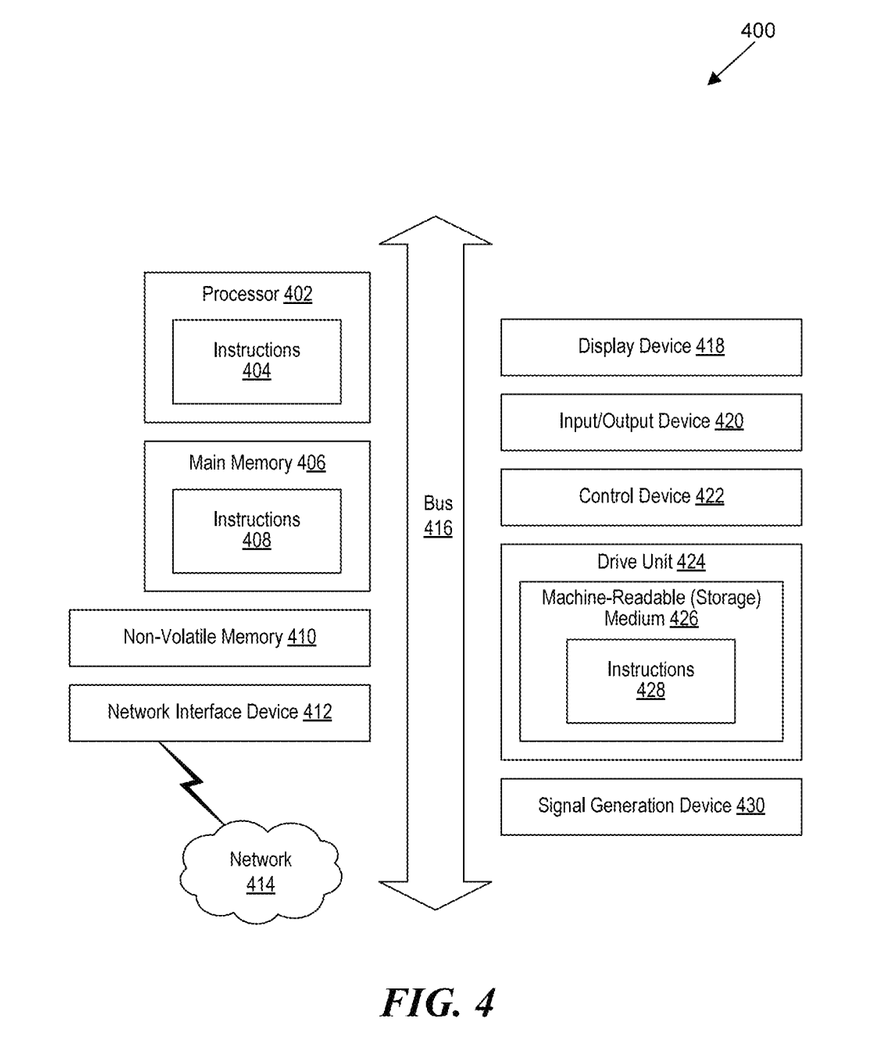
FIG. 4 is a block diagram that illustrates an example of a computer system in which at least some operations described herein can be implemented.

FIG. 4 is a block diagram that illustrates an example of a computing system 400 in which at least some operations described herein can be implemented. As shown, the computing system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computing system 400 is intended to illustrate a hardware device on which components illustrated or described relative to the examples of the figures and any other components described in this specification can be implemented.

The computing system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computing system 400 can be an embedded computer system, a system-on-chip (SOC), a single-board computer system or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a meansplus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A system including a session border controller (SBC) coupled to an internet protocol (IP) multimedia core subsystem (IMS) of a telecommunications network, the SBC comprising:
    at least one hardware processor; and
    at least one non-transitory memory storing instructions, which, when executed by the at least one hardware processor, cause the SBC to:
        obtain information indicative of a roaming profile of a particular subscriber associated with the telecommunications network,
            wherein the information of the roaming profile is retrieved from a home subscriber server (HSS) of the telecommunications network, and
            wherein the roaming profile indicates one or more geographic areas in which the particular subscriber is authorized to access a communications service;
        receive, from a wireless device on the telecommunications network, a request to connect a particular voice call over a Wi-Fi network associated with the telecommunications network,
            wherein the wireless device is associated with the particular subscriber;
        identify a current location of the wireless device based on network registration information for the wireless device on the telecommunications network;
        compare the current location of the wireless device with the one or more geographic areas in which the particular subscriber is authorized to access the communications service as indicated in the roaming profile;
        determine that a particular geographic area of the one or more geographic areas includes the current location and the particular subscriber is authorized to access the communications service; and
        enable the IMS to establish a session for the particular voice call over the Wi-Fi network.

2. The system of claim 1 further caused to:
    receive, from the wireless device on the telecommunications network, a second request to connect a particular voice call over the Wi-Fi network associated with the telecommunications network,
        wherein the wireless device is located in a second location;
        wherein the second location is outside the one or more geographic areas in which the particular subscriber is authorized to access a communications service, and
        wherein the IMS is thereby not enabled to establish a call over the Wi-Fi network.

3. The system of claim 1 further caused to, prior to the particular voice call being connected via the Wi-Fi network:
    store the roaming profile at the SBC,
        wherein the determination that the particular subscriber is authorized to access the communications service is based on the roaming profile stored at the SBC.

4. The system of claim 1 wherein the determination that the particular subscriber is authorized to access the communications services is based on the roaming profile stored at the HSS.

5. The system of claim 1 further caused to:
    receive periodic updates of the roaming profile from the HSS, and
    store the periodic updates of the roaming profile at the SBC.

6. The system of claim 1 further caused to:
    in an instance that a billing plan associated with a subscription of the particular subscriber to the telecommunications network has changed at a customer relationship management (CRM) system of the telecommunications network:
        receive updated information of the roaming profile from the HSS based on the change at the CRM system; and
        store the updated information of the roaming profile at the SBC.

7. The system of claim 1 further caused to:
    store, at the SBC, instances of registration information of multiple wireless devices registered on the telecommunications network,
        wherein the instances of registration information indicate respective geographic locations when the multiple wireless devices registered to the telecommunications network, and
        wherein a particular instance of registration information is captured upon a particular wireless device connecting to the telecommunications network.

8. The system of claim 1 further caused to:
    store, at the SBC, instances of registration information of multiple wireless devices registered on the telecommunications network,
        wherein the instances of the registration information indicate respective geographic locations when the multiple wireless devices registered to the telecommunications network, and
        wherein a particular instance of the registration information is captured periodically.

9. The system of claim 1 further caused to:
    store, at the SBC, multiple roaming profiles for multiple subscriber,
        wherein the multiple subscribers include the particular subscriber.

10. The system of claim 1 further caused to:
    in response to receiving the request,
        lookup, based on an identifier of the particular subscriber, the roaming profile of the particular subscriber from among multiple roaming profiles stored at the SBC,
            wherein the request includes the identifier of the particular subscriber.

11. The system of claim 1, wherein:
    the particular geographical area corresponds to a country.

12. A computer-implemented method for connecting voice call requests from wireless devices received via a Wi-Fi network to an internet protocol (IP) multimedia core subsystem (IMS) of a telecommunications network, the method comprising:
    receiving, by a session border controller (SBC) from a wireless device on the telecommunications network, a request to connect a particular voice call over a Wi-Fi network associated with the telecommunications network, wherein the wireless device is associated with a particular subscriber;

identifying, by the SBC, a current location of the wireless device based on network registration information for the wireless device on the telecommunications network;

comparing, by the SBC, the current location of the wireless device with one or more geographic areas in which the particular subscriber is authorized to access a communications service as indicated in a subscriber profile of the particular subscriber;

determining, by the SBC, that a particular geographic area of the one or more geographic areas includes the current location and the particular subscriber is authorized to access the communications service; and enabling, by the SBC, the IMS to establish a session for the particular voice call over the Wi-Fi network.

13. The method of claim 12, further including:

obtaining, by the SBC, information indicative of the subscriber profile of the particular subscriber associated with the telecommunications network, wherein the information of the subscriber profile is retrieved from a home subscriber server (HSS) of the telecommunications network, and wherein the subscriber profile indicates one or more geographic areas in which the particular subscriber is authorized to access the communications service.

14. The method of claim 12 further comprising:

receiving, from the wireless device on the telecommunications network, a second request to connect a particular voice call over the Wi-Fi network associated with the telecommunications network, wherein the wireless device is located in a second location;

wherein the second location is outside the one or more geographic areas in which the particular subscriber is authorized to access a communications service, and wherein the IMS is thereby not enabled to establish a call over the Wi-Fi network.

15. The method of claim 12 further comprising, prior to the particular voice call being connected via the Wi-Fi network:

storing the subscriber profile at the SBC, wherein the determination that the particular subscriber is authorized to access the communications service is based on the subscriber profile stored at the SBC.

16. The method of claim 12, wherein the determination that the particular subscriber is authorized to access the communications services is based on the subscriber profile stored at a home subscriber server (HSS) of the telecommunications network.

17. A wireless device comprising:

at least one hardware processor; and at least one non-transitory memory storing instructions, which, when executed by the at least one hardware processor, cause the wireless device to:

send, to a session border controller (SBC) of a telecommunications network, a request to connect a voice call over a Wi-Fi network associated with the telecommunications network;

wherein the wireless device is associated with a subscriber of the telecommunications network;

wherein the request to connect the voice call is associated with one or more features;

receive a signal indicating that the subscriber is either authorized or unauthorized to connect the voice call over the Wi-Fi network, wherein the SBC determines whether the subscriber is authorized or unauthorized to access a communications service based on the comparison of the one or more features with a subscriber profile associated with the subscriber;

when the subscriber is authorized to access the communications service, connect the wireless device to a session for the voice call over the Wi-Fi network; and when the subscriber is unauthorized to access the communications service, forgo connecting the voice call over the Wi-Fi network.

18. The wireless device of claim 17 further caused to, prior to the request being sent to the SBC:

perform registration of the wireless device with the telecommunications network, wherein a current location of the wireless device is provided to the telecommunications network during the registration, wherein the one or more features include the current location, and wherein the subscriber profile indicates locations in which the wireless device is authorized to access the communications service.

19. The wireless device of claim 17:

wherein the one or more features associated with the request to connect the voice call include an audio quality, a bandwidth, and/or a compression for the voice call, and wherein the determination that the subscriber is authorized to access the communications service is based on whether the session supports the audio quality, the bandwidth, and/or the compression.

20. The wireless device of claim 17, wherein the voice call over the Wi-Fi network is denied when the SBC determines that the voice call is a fraud call.

* * * * *